H. B. HUNTER.
PROCESS OF MAKING CARBON DIOXID.
APPLICATION FILED DEC. 1, 1908.
1,044,531.
Patented Nov. 19, 1912.
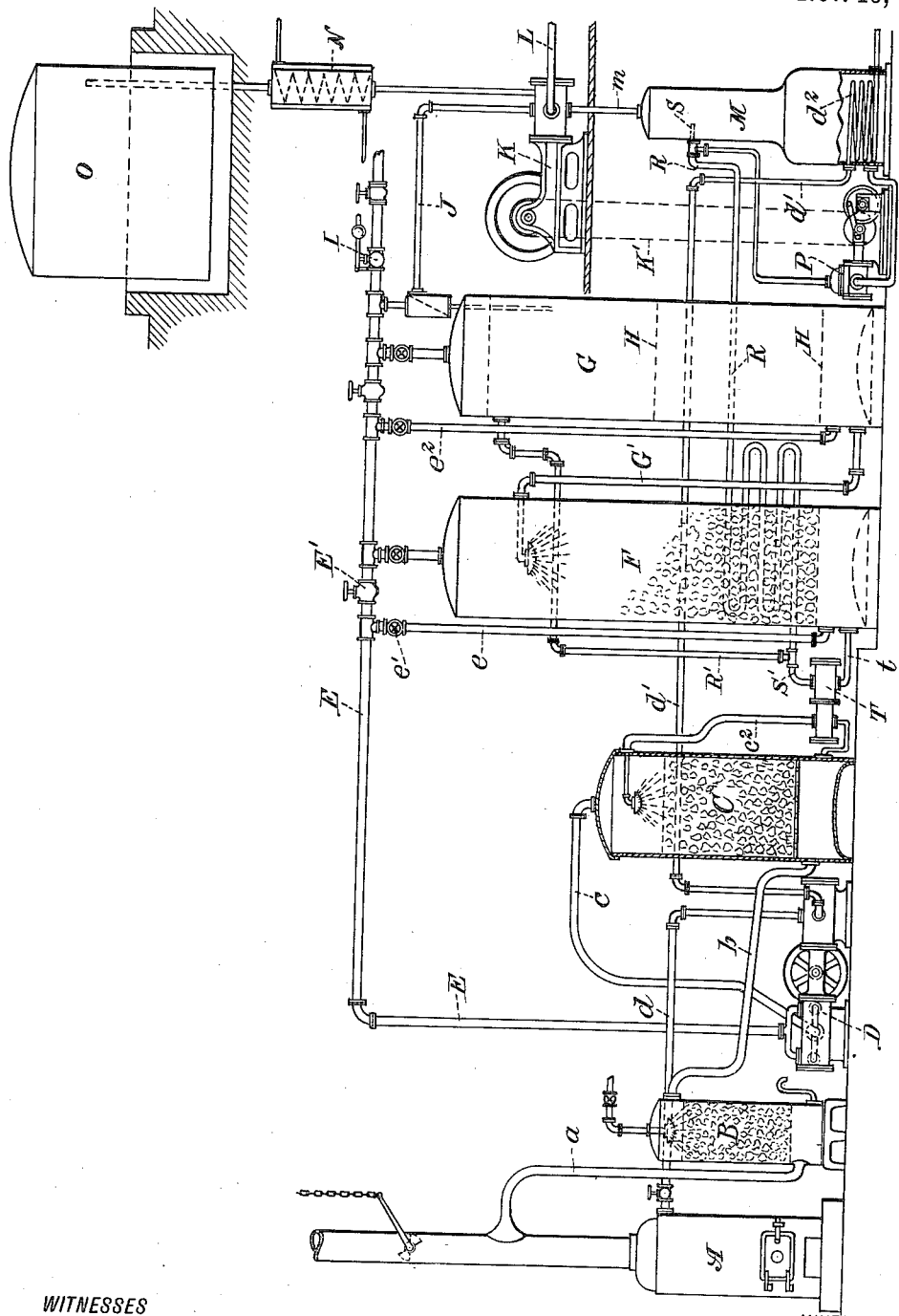
WITNESSES
INVENTOR
HENRY BLOUNT HUNTER
BY
ATTORNEYS

UNITED STATES PATENT OFFICE.

HENRY BLOUNT HUNTER, OF NEW YORK, N. Y.

PROCESS OF MAKING CARBON DIOXID.

1,044,531.

Specification of Letters Patent.   Patented Nov. 19, 1912.

Application filed December 1, 1908.  Serial No. 465,532.

*To all whom it may concern:*

Be it known that I, HENRY BLOUNT HUNTER, a citizen of the United States of America, resident of New York city, State of New York, have invented certain new and useful Improvements in Processes of Making Carbon Dioxid, of which the following is a specification.

My invention relates to a process of obtaining carbonic acid gas by a continuous process in which the waste energies are utilized in furtherance of the development of details of the process; more particularly my invention relates to that process of obtaining carbon dioxid wherein the gas is forced through the apparatus under pressure of several atmospheres.

The details of my invention are shown in the accompanying drawing, in which—

A represents the boiler in the furnace of which I treat material composed substantially of carbon, such, for instance, as coke or charcoal. The products of this furnace are composed mainly of carbon dioxid, nitrogen and what may be called impurities. This mixture of gases passes through the pipe *a* into the scrubber B, which is filled with coke or the like and sprayed with water. The object of this scrubber B is to remove from the furnace gases the coarser or cruder impurities; from the scrubber B, the preliminarily washed gases are passed through the pipe *b* into the chemical purifier C. This scrubber C is also filled with coke or the like, and is sprayed with a chemical solution adapted to remove from the furnace gases all deleterious gases still remaining in the furnace gas. A chemical solution suitable for this purpose consists of bicarbonate of soda or bicarbonate of potash. From the chemical purifier C the gas is carried through the pipe *c* to the compressor D. In this part of the apparatus the gases are composed of carbon dioxid and nitrogen, with perhaps a small addition of carbon monoxid and oxygen. All of these gases except $CO_2$ pass through the absorbers without undergoing any chemical action, and are not deleterious in the use of the process. In this compressor the cleansed furnace gases entering through the pipe *c* are placed under a pressure of about five atmospheres. This compressor D is operated by means of steam from the boiler A entering through pipe *d*. The exhaust from this compressor passes out through the pipe *d'*, whose connections with other parts of this apparatus will be described later.

The compressed gases pass from the compressor D through the pipe line E, from which they pass first through the pipe *e* when the valve E' is closed and the valve *e'* is opened into the lower portion of the first absorber F. In this absorber F I may use either a physical absorber, such as water, or a chemical absorber, such as carbonate of potash solution; preferably I fill the absorber F with coke as shown in the drawing, spraying the coke with carbonate of potash solution from the succeeding absorber.

The effect of the passage of the compressed gases through the absorber F is to extract the greater part of the carbon dioxid from said gases which enters into chemical combination with the potassium carbonate, forming bicarbonate. This bicarbonate solution settles at the bottom of the apparatus, and its further treatment will be described later. From the absorber F the remaining gases still under compression are passed again into the pipe E and through the pipe $e^2$ into the second absorber G. The second absorber may be operated exactly as the first absorber F, but preferably I force the compressed gases through a body of potassium carbonate solution. The passage of the gases through absorber G is broken by perforated diaphragms H, or equivalent means, in this absorber G. A convenient method of supplying the absorber F with the necessary spraying solution is illustrated where it is shown that the level of the liquid in the absorber G is used to force the spraying solution through the pipe G' terminating in a rose-jet into the absorber F. From the absorber G the remaining compressed gases may be passed either to a further series of absorbers, in which case the pipe line E will be extended as indicated by its broken away end, or directly into the exhaust system in case the absorbers F and G are sufficient to commercially complete the extraction of $CO_2$ from the gases. A safety valve I terminates the system at this point, the remainder of the compressed gases now consisting substantially of nitrogen with small quantities of air and carbon oxids passing from the pipe line E through the connection J to an engine K. This engine K is driven by the compressed gases which, upon the completion of their activity, are allowed to pass from the system through the exhaust L.

The engine may be used for liquefying the $CO_2$, or for any other suitable purpose in the factory.

The principle upon which my system is constructed is based upon the treatment of carbon dioxid gases under pressure, and in the extraction from said compressed gases of the carbon dioxid by some suitable means. The absorbent or solvent of the carbon dioxid removed from the compressed gases is then subjected to a process whereby the carbon dioxid is again separated from its absorbent or solvent. Suitable absorbents are carbonate of potassium and carbonate of soda and the like, and suitable solvents would be solutions of alcohol and glycerin. For the purpose of an illustration I will refer only to the process of using carbonate of potassium. I have already described that in the absorber F the potassium carbonate takes up the $CO_2$ forming bicarbonate of potassium which settles at the bottom of the absorber F. From the bottom of the absorber F the bicarbonate solution is taken to a generator M, which is illustrated as being heated by means of the exhaust steam from the compressor D, passing through the exhaust pipe $d'$ into the coil $d^2$. This heating action in the generator M liberates the $CO_2$ from the bicarbonate solution, leaving the carbonate solution free for further use over again in the system. The waste heat of the $CO_2$ liberated in the generator M is utilized by passing the $CO_2$ through the pipe m into the heating jacket of the engine K after which it passes through the cooler N and into the gasometer O from which it is drawn and liquefied in the usual manner or utilized directly in the manufacture of commercial products. The importance of utilizing the heat of the $CO_2$ in the steam jacket of the engine K resides in the fact that it prevents the freezing up of the exhaust pipe L by the moisture of the waste gases which has a tendency to solidify because of the release of pressure at this point. The heat of the $CO_2$ gas also expands the gases entering the engine K through the pipe J and therefore increases the motive power or efficiency of the gases.

The heat of the rejuvenated lye or carbonate solution leaving the generator M is further utilized by the following means: It passes through a pump P driven by a belt K' from the engine K. This pump P forces it into the heat exchange system R S, R' S'. This heat exchange system comprises a series of double pipes, one inside of the other, the hot carbonate solution passing in one direction and the cold bicarbonate solution passing in the other direction. The hot lye is cooled as it passes through the pipe R (the outside of the double pipes in the illustration, but in practice it is preferably reversed) and when sufficiently cooled passes up the pipe R' into the upper portion of the absorber G. The bicarbonate solution which is heated by reason of the heat exchange apparatus empties through the pipe S into the generator M. It is brought to this point by being withdrawn from the bottom of the absorber F through the pipe $t$ into the pump T from which it passes through the pipe S, through the double pipe heat exchange.

As the bicarbonate solution in the absorber F is under considerable pressure, this pressure will force the bicarbonate solution through the system $t$ T, S' S. The excess pressure is utilized to drive the pump T, the object of which is to circulate the chemical solution in the purifier C by means of the circulating pipe $c^2$.

The process described by me is capable of use in a very compact apparatus occupying little space and having a maximum amount of efficiency due to the large amount of pressure employed in the system. Heretofore no one thought of utilizing any large amount of pressure in a commercial apparatus because the initial cost of producing such pressure seemed prohibitive. My process, however, makes it possible to use a large amount of pressure which results in an increased efficiency in the absorption and greater rapidity of absorption of $CO_2$ by the lye, because I use the same pressure as a motive power to maintain my system in continuous operation and I also use the heat necessary to create the pressure, in various ways. No part of the motive force of the pressure or of the heat to create it is allowed to go to waste, and the entire system working together prevents all necessity of shutting down one portion of the apparatus in order to allow another portion of the apparatus to work, but the entire system tends toward a uniformity, continuity and simplicity of automatic operation.

I have described my system in considerable detail, all of which can be modified and replaced by a similar or equivalent system without departing from the spirit of my invention. Thus, for instance, it may not be necessary in some cases to use more than one absorber or more than one purifier, and many other modifications can readily be supplied by those skilled in the art without departing from the spirit of my invention, the fundamental idea of which comprises a continuous uninterrupted process for manufacturing $CO_2$, all of the component parts of which are continuously and uninterruptedly functioning simultaneously, and in which the pressure and heat of the system is employed to maintain and establish the continuity of the process.

What I claim is:

1. The process of continuously producing carbon dioxid which consists in bringing a current of gas containing said carbon dioxid into contact with a medium adapted to remove impurities, then subjecting said gas to a high pressure and bringing it into contact with a carbon dioxid absorbing medium, utilizing some of said pressure to remove said medium as absorption takes place to a chamber where it is heated to again drive off the carbon dioxid and utilizing another part of said pressure to restore the rejuvenated medium to the absorbing point, the supply of gas and the movement of the absorbing medium being continuous, substantially as and for the purpose described.

2. The process of continuously producing carbon dioxid which consists in bringing a current of gas containing said carbon dioxid into contact with a medium adapted to remove impurities, then subjecting said gas to a high pressure as it comes from said purifying medium and, while under pressure bringing it into contact at one point with a continuous stream of absorbing medium, heating said stream at another point to drive off the absorbed carbon dioxid and utilizing part of said pressure for keeping said stream in motion, substantially as and for the purpose described.

In testimony whereof I have hereunto set my hand this 17th day of November, 1908, in the presence of two subscribing witnesses.

HENRY BLOUNT HUNTER.

Witnesses:
  JOHN LOTKA,
  JOHN A. KEHLENBECK.